US008595353B2

(12) United States Patent
DeLuca et al.

(10) Patent No.: US 8,595,353 B2
(45) Date of Patent: Nov. 26, 2013

(54) AUTOMATED RECOMMENDATIONS FOR CLOUD-COMPUTING OPTIONS

(75) Inventors: Lisa Seacat DeLuca, San Francisco, CA (US); Soobaek Jang, Hamden, CT (US)

(73) Assignee: International Business Machines Corporation, Armonk, NY (US)

( * ) Notice: Subject to any disclaimer, the term of this patent is extended or adjusted under 35 U.S.C. 154(b) by 147 days.

(21) Appl. No.: 13/153,492

(22) Filed: Jun. 6, 2011

(65) Prior Publication Data

US 2012/0311135 A1    Dec. 6, 2012

(51) Int. Cl.
*G06F 15/173*    (2006.01)
(52) U.S. Cl.
USPC .......................................... 709/224; 709/203
(58) Field of Classification Search
USPC ......................................................... 709/224
See application file for complete search history.

(56) References Cited

U.S. PATENT DOCUMENTS

| 7,774,349 | B2 * | 8/2010 | Horvitz et al. | 707/749 |
| 2002/0133710 | A1 * | 9/2002 | Tarbotton et al. | 713/188 |
| 2009/0132526 | A1 | 5/2009 | Park | |
| 2009/0276771 | A1 * | 11/2009 | Nickolov et al. | 717/177 |
| 2010/0153443 | A1 * | 6/2010 | Gaffga et al. | 707/770 |
| 2010/0169340 | A1 | 7/2010 | Kenedy et al. | |
| 2010/0198944 | A1 | 8/2010 | Ho et al. | |
| 2010/0287071 | A1 | 11/2010 | Shah et al. | |
| 2010/0325629 | A1 | 12/2010 | Fujioka et al. | |
| 2011/0010324 | A1 | 1/2011 | Bolivar et al. | |
| 2011/0055399 | A1 | 3/2011 | Tung et al. | |

OTHER PUBLICATIONS

Cosley et al., "Referee: An Open Framework for Practical Testing of Recommender Systems Using ResearchIndex," Proceedings of the 28th VLDB Conference, Hong Kong, China, 2002.

* cited by examiner

*Primary Examiner* — Christopher Biagini
(74) *Attorney, Agent, or Firm* — Gibb & Riley, LLC

(57) ABSTRACT

Systems, computer storage devices, and methods receive a request from a first user. The first user has at least one instance running within a cloud-computing environment. The systems, computer storage devices, and methods automatically analyze the first user instance to produce first user instance characteristics, and automatically analyze characteristics of other user instances running within the cloud-computing environment. Other users, who are different from the first user, operate the other user instances. The systems, computer storage devices, and methods automatically match the first user instance to instances of the other user instances by determining which of the other user instances have the same characteristics as the first user instance characteristics. The systems, computer storage devices, and methods automatically identify cloud-computing options selected by such other users that operate the matching instances that are related to the request. The systems, computer storage devices, and methods then automatically make recommendations to the first user using the computing devices.

24 Claims, 8 Drawing Sheets

AUTOMATED RECOMMENDATIONS FOR CLOUD-COMPUTING OPTIONS

BACKGROUND

The embodiments herein relate to cloud engineering and experience and provide a cloud-computing collaborative system configuration that provides recommendations to instance users based on other users previous option selections.

With cloud-computing users have access to a large number of items, such as images, that can be accessed/run on their cloud, and the cloud provides a broad range of options to the user. The problem with having so many options as a user is the confusion that comes with the excessive amount of choices. If a user is not an expert of a particular item (such as an image) the user might struggle with choosing among the myriad of options. A similar problem exists when an upgrade or patch is available for an instance running on the cloud. For example, the user is often presented with the choice of whether to apply the upgrade or ignore it. The embodiments described below create a solution to this problem by providing a recommendation to the user based on previous choices made by similar users.

SUMMARY

According to one exemplary embodiment, a computer-implemented method receives a request into at least one computing device from a first user. The first user has at least one instance running within a cloud-computing environment. For purposes herein an "instance" is a software program of instructions that executes within the cloud-computing environment by utilizing resources of the cloud-computing environment.

The method automatically analyzes the first user instance to produce first user instance characteristics, and automatically analyzes characteristics of other user instances running within the cloud-computing environment (sometimes referred to herein as "second characteristics") using the computing devices. Other users, who are different from the first user, operate the other user instances.

The method automatically matches the first user instance to instances of the other user instances by determining which of the other user instances have the same characteristics as the first user instance characteristics, again using the computing devices. The method automatically identifies cloud-computing options selected by other users that operate the matching instances that are related to the request, also using the computing devices. The method then automatically makes recommendations to the first user using the computing devices. The recommendations provide the cloud-computing options that were selected by the other users within the matching instances.

According to another exemplary embodiment, a computer-implemented method again receives a request into at least one computing device from a first user, where the first user has at least one instance running within a cloud-computing environment. The method automatically analyzes the first user instance to produce first user instance characteristics, and automatically analyzes characteristics of other user instances running within the cloud-computing environment using the computing devices. The method automatically matches the first user instance to instances of the other user instances by determining which of the other user instances have the same characteristics as the first user instance characteristics, again using the computing devices. The method automatically identifies cloud-computing options selected by such other users that operate the matching instances that are related to the request, also using the computing devices. The method then automatically makes recommendations to the first user using the computing devices. The recommendations provide the cloud-computing options that were selected by the other users within the matching instances. Further, the method receives feedback from the first user in response to the recommendations and automatically refines the recommendations based on the feedback, using the computing devices.

A computerized system embodiment comprises at least one computing device. The computing devices each have a processor, an input/output connection operatively connected to (directly or indirectly connected to) the processor. The input/output is further connected to the cloud-computing environment. The computing devices also have a user interface (also operatively connected to the processor) receiving a request from a first user having at least one first user instance running within the cloud-computing environment.

The processor automatically analyzes the first user instance to produce first user instance characteristics, and analyzes second characteristics of other user instances running within the cloud-computing environment. The other user instances are operated by other users different from the first user. The processor automatically matches the first user instance to other user's instances by determining which of the other user instances have the second characteristics that match the first user instance characteristics. The processor then automatically identifies cloud-computing options selected by the other users within the matching instances that are related to the request. The user interface can then automatically make recommendations to the first user, where such recommendations include the cloud-computing options selected within the matching instances.

A non-volatile computer storage medium device embodiment tangibly stores a program of instructions that are executable by a computing device. The program of instructions causes the computing device to perform a method that receives a request from a first user. The first user has at least one instance running within a cloud-computing environment. The method automatically analyzes the first user instance to produce first user instance characteristics, and automatically analyzes characteristics of other user instances running within the cloud-computing environment. The method automatically matches the first user instance to instances of the other user instances by determining which of the other user instances have the same characteristics as the first user instance characteristics. The method automatically identifies cloud-computing options selected by such other users that operate the matching instances that are related to the request. The method then automatically makes recommendations to the first user. The recommendations provide the cloud-computing options that were selected by the other users within the matching instances.

BRIEF DESCRIPTION OF THE SEVERAL VIEWS OF THE DRAWINGS

The embodiments will be better understood from the following detailed description with reference to the drawings, which are not necessarily drawing to scale and in which.

DETAILED DESCRIPTION

Figure 1:
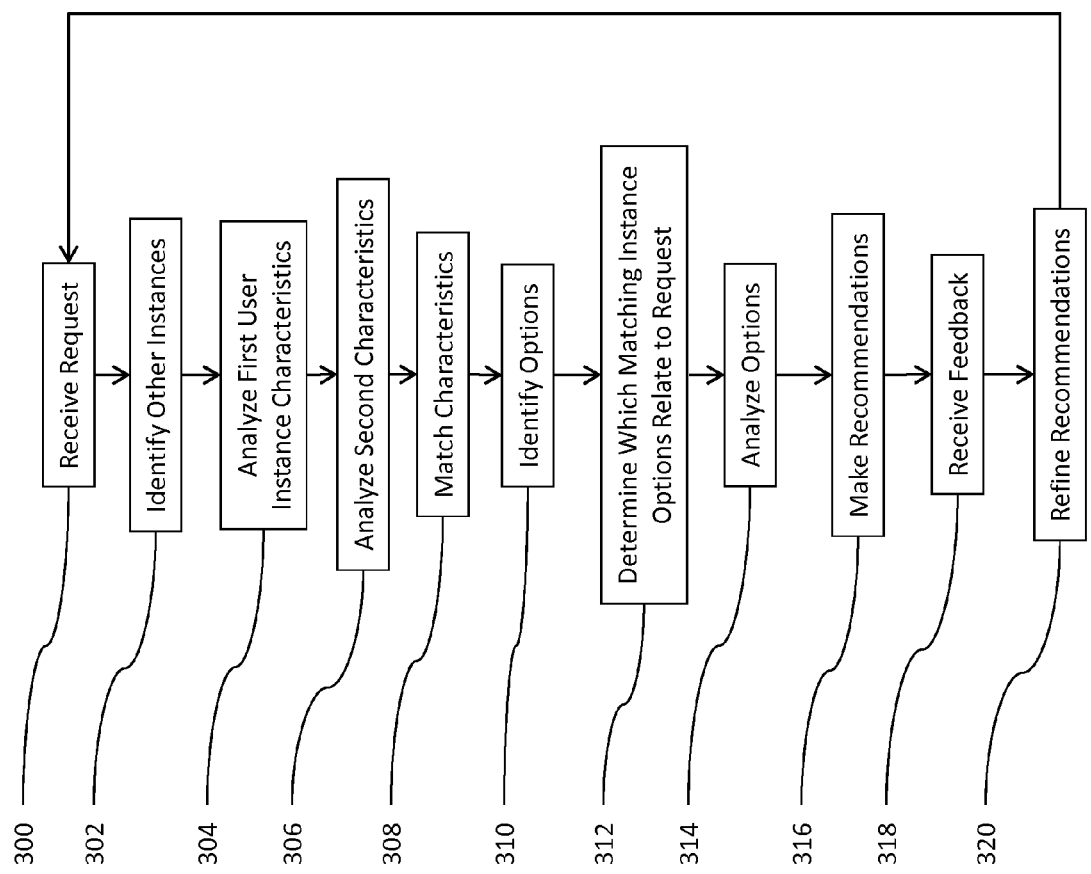
FIG. 1 is a flow diagram illustrating various embodiments herein.

As mentioned above, a user of an instance running on a cloud-computing environment may experience the confusion that comes with the excessive amount of choices available in the cloud-computing environment. Therefore, disclosed is a system and method to provide a recommendation of configuration and selection choices to a user by comparing the choices with similar choices made by similar users.

Thus, a user interacting with the cloud will at some point be faced with a decision of which choice to make, and may need assistance with choosing among the various options available. In view of this, with the embodiments herein, the cloud data is analyzed and the system suggests instance and configuration options to allow the user to choose among the available options. The recommendations made to the users can be ordered with respect to the analyzed data and can, for example, be based on the overall popularity of the options selected by other cloud users.

More specifically, when analyzing the cloud data the embodiments herein aggregate actual instances running on the cloud. Such information about currently running instances can include which instances are running, which are stopped, stopping, which are failed, which are provisioning, which are restarting, etc. In addition, data relating to the user is also accumulated including data related to demographics, company size, installed instances, expertise, surfing patterns, etc.

Additionally, during the analysis of the cloud data, various feed data is also analyzed. A feed on cloud system can be used to notify users of any update or upgrade on any particular software they have on their systems. With the embodiments herein, feed data is gathered from the support or account page specific to the instances installed, and other outside feed data is gathered. The feed recommendations made can also be based on the notifications from the user's environment. For example, if a user has stopped a certain database instance, the embodiments herein will determine that it is no longer necessary to show the user upgrade notices as a high priority. In addition, users can get aggregated data in their account page or specific updates for each system on their instance detail page with the embodiments herein.

The embodiments herein not only provide recommendations for cloud-computing options, but also provide the added technical enhancements of monitoring installed and active instances. So, while the user may have an instance, the embodiments herein recognize when the instance is not currently active, and can therefore modify recommendations accordingly.

Another feature provided by the embodiments herein is the interaction and feedback between the user and the system. More specifically, the embodiments herein provide specific questions to help refine the recommendations. The embodiments herein can ask questions of the user up front, or after the user has taken some action, such as selecting an image.

For example, before the user even selects an image the embodiments herein can provide an Image Picker Wizard. Such a wizard can present questions such as "What do you want to accomplish with your instance: (a) Web hosting (b) File system (c) Application Development." Such questionnaires continue to more specific questions to give narrow selection to users at the end.

Alternatively, a user can select an image first, and then the system will ask what the user wants to accomplish with the image using questions such as: "What do you want to accomplish with your instance: (a) Development (b) Production DB"; "How much data do you expect to grow per month with your production DB server?: (a) 10 GB (b) 50 GB (c) 100 GB (d) More than 100 GB"; etc.

FIG. 1 is a flowchart illustrating various computer-implemented methods described herein. Beginning in item 300 the processing begins by receiving a request into at least one computing device from an arbitrarily named "first" user. The first user can have at least one instance running within a cloud-computing environment. For purposes herein an "instance" includes a software program of instructions that executes within the cloud-computing environment by utilizing resources of the cloud-computing environment. The software program performs some function desired by the first user. For example, with respect to databases, the term instance is typically used to describe a complete database environment, including the software, table structure, stored procedures and other functionality. The term instance is most commonly used when administrators describe multiple instances of the same database.

Figure 2:
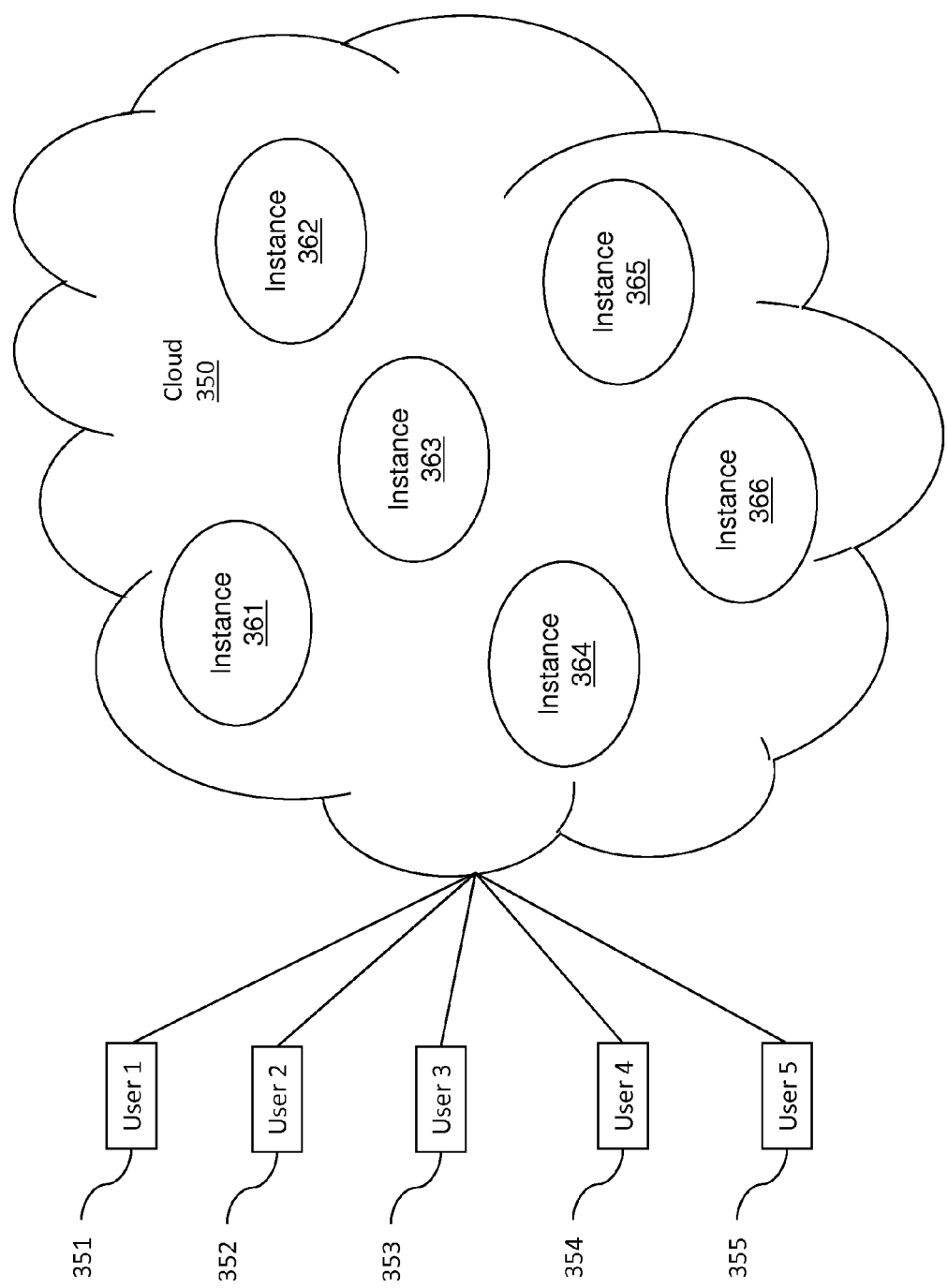
FIG. 2 is a schematic diagram of users running instances using computerized devices connected to a cloud-computing environment.

Referring briefly to FIG. 2, items 351-355 illustrate various computerized devices operated by different users (User 1-User 5) that are connected to a cloud-computing environment 350. Within the cloud-computing environment 350, various instances 361-366 exist. The various instances 361-366 can be in many different states: running, inactive, provisioning, etc. Each of the users 351-355 can operate more than one instance.

In FIG. 1, the request in item 300 can be a user's response to an automated prompt, can be in the form of user input to a selection wizard operating on the computing devices, can be previously stored requests for periodic feeds, etc. In other words, when the first user utilizes an instance, the embodiments herein can automatically prompt the user with questions to determine the intentions and goals of the first user with respect to the instance. Responses to such questions would provide the request shown in item 300. Alternatively, the user can initiate an instance wizard software program, and provide input to the wizard program to provide the request in item 300. Similarly, pre-established feed requests can provide the request in item 300. Those ordinarily skilled in the art will understand that there are many additional ways that a request could be provided through a computing device, and the embodiments herein include all such diverse ways of receiving a request.

In item 302, the exemplary method identifies the other instances within the cloud-computing environment. Other users, who are different from the first user, operate the other user instances. Such other instances can be identified in item 302 by identifying and analyzing instances running within the cloud-computing environment, identifying and analyzing instances stopped on the cloud-computing environment, identifying and analyzing instances stopping on the cloud-computing environment, identifying and analyzing instances failed on the cloud-computing environment, identifying and analyzing instances provisioning on the cloud-computing environment, identifying and analyzing instances restarting on the cloud-computing environment, etc. Those ordinarily skilled in the art will understand that there are many additional ways that a computing device could identify the other instances, and the embodiments herein include all such diverse ways of identifying instances within the cloud-computing environment.

In item 304, the method automatically analyzes the first user instance to produce first user instance characteristics, and in item 306 the method automatically analyzes characteristics of the other user instances running within the cloud-computing environment (sometimes referred to herein as "second characteristics") using the computing devices. The first user instance characteristics and the second characteristics can include such items as the classification of the software programs utilized, the resources utilized, the usage rates, the usage requirements, the history of the instance, etc. The analysis performed in items 304 and 306 can be performed simultaneously or sequentially.

In item 308, the method automatically matches the first user instance to ones of the other user instances. The matching process in item 308 finds matches between the second characteristics of the other user instances and the first user instance characteristics, again using the computing devices. When performing the matching in item 308, various presets or user adjustable parameters can be utilized to determine whether one of these second characteristics matches the first user instance characteristics. For example, if some usage rate or processing rate characteristic is being evaluated, the adjustable parameter can be a percentage (such as 90%) and the second characteristic can match the first user instance characteristic if the second characteristic is within 90% of the first user instance characteristic. Those ordinarily skilled in the art would understand that many different adjustable parameters could be utilized to evaluate whether certain characteristics match in item 308.

In item 310, the method automatically identifies cloud-computing options selected by such other users that operate the matching instances, also using the computing devices. The cloud-computing options can be configuration and selection choices. For example, when operating an instance, a user may have a wide variety of options that are input or selected from menu choices and these option/menu choices are identified in item 310. Then, in item 312 the method determines which of the selected options of the matching instances relate to the request received in item 300. Item 312 can be performed by matching exact option choices, matching categories of option choices, etc.

In item 314, the methods herein can optionally analyze these option choices by, for example, performing statistical analysis, performing data mining and clustering, performing optimization analysis, performing selective filtering of options, etc. The analysis in item 314 can produce a ranking of options (with, for example, the most popular or optimized options being ranked first); can produce a reduced set of options (to avoid overwhelming the first user with too many options); can filter out inappropriate options (based on age restrictions, taste, and social norms, for example); etc.

In item 316, the method then automatically makes recommendations to the first user using the computing devices. The recommendations provide the cloud-computing options that were selected by the other users within the matching instances. If the request is, for example, a request for an image resource, the recommendations can comprise options relating to the image resource. Similarly, if the request is a software upgrade, the recommendations can comprise options relating to the software upgrade.

In item 318, the method can receive feedback from the first user in response to the recommendations. Therefore, when the recommendations are made in item 316, additional questions can be presented to the first user to allow the first user to refine the intentions or goals that were received in item 300. Then, in item 320, based on the feedback, the process can automatically refine the recommendations by returning to item 300 and repeating the process within the newly refined intentions and goals.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in at least one computer readable medium(s) having computer readable program code embodied thereon.

Any combination of at least one computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having at least one wire, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of at least one programming language, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or D-2 block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 3:
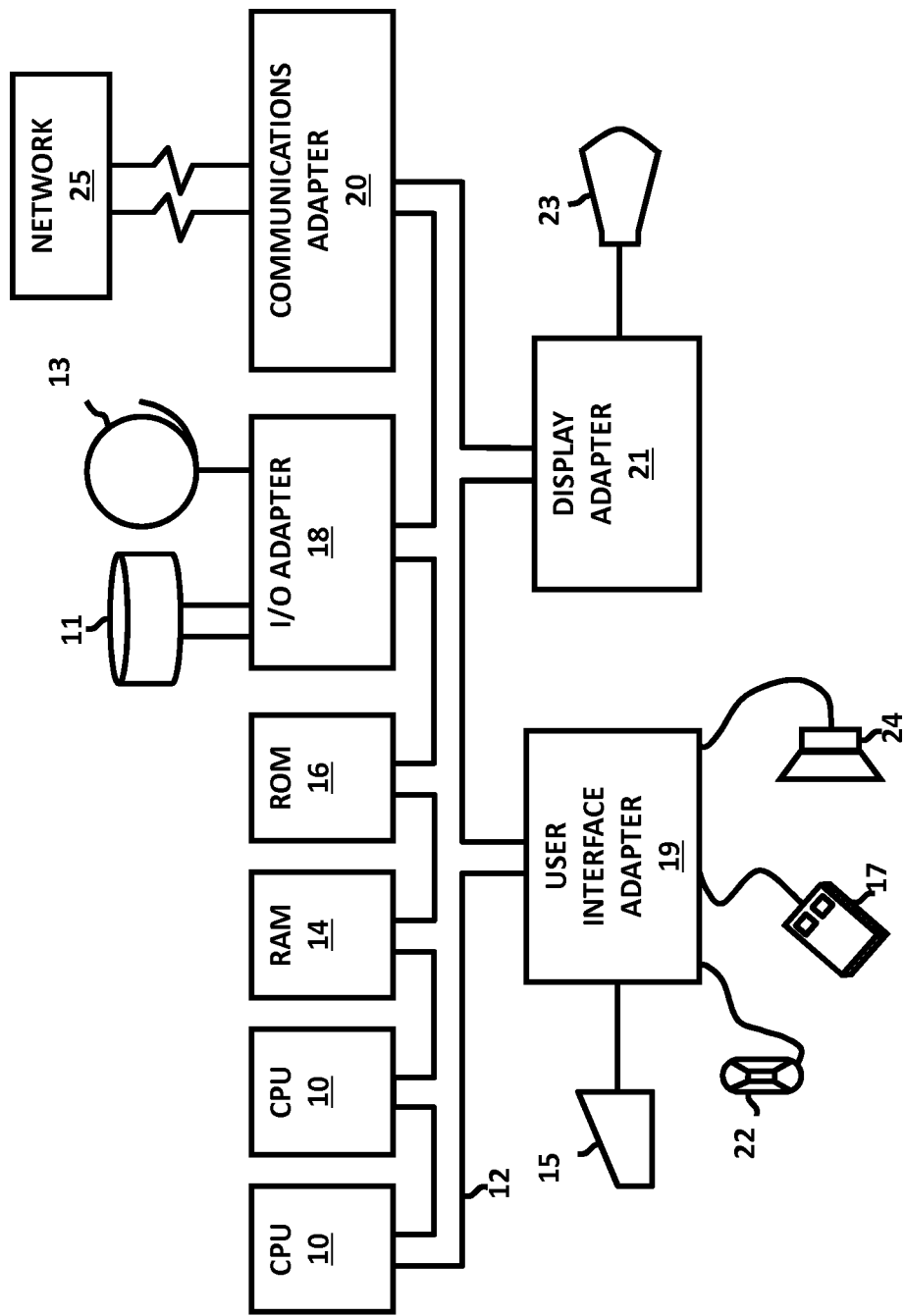
FIG. 3 is a schematic diagram illustrating an exemplary hardware environment that can be used to implement the embodiments.

A representative hardware environment for practicing the embodiments is depicted in FIG. 3. This schematic drawing illustrates a hardware configuration of an information handling/computer system in accordance with the embodiments of the disclosure. The system comprises at least one processor or central processing unit (CPU) 10. The CPUs 10 are interconnected via system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of the embodiments of the disclosure. The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

The processor 10 automatically analyzes the first user instance to produce first user instance characteristics, and analyzes second characteristics of other user instances running within the cloud-computing environment. The other user instances are operated by other users different from the first user. The processor 10 automatically matches the first user instance to other user's instances by determining which of the other user instances have the second characteristics that match the first user instance characteristics. The processor 10 then automatically identifies cloud-computing options selected by the other users within the matching instances that are related to the request. The user interface can then automatically make recommendations to the first user, where such recommendations include the cloud-computing options selected within the matching instances.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises at least one executable instruction for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Deployment Types include loading directly in the client, server and proxy computers via loading a storage medium such as a CD, DVD, etc. The process software may also be automatically or semi-automatically deployed into a computer system by sending the process software to a central server or a group of central servers. The process software is then downloaded into the client computers that will execute the process software. The process software is sent directly to the client system via e-mail. The process software is then either detached to a directory or loaded into a directory by a button on the e-mail that executes a program that detaches the process software into a directory. Send the process software directly to a directory on the client computer hard drive. When there are proxy servers, the process will, select the proxy server code, determine on which computers to place the proxy servers' code, transmit the proxy server code, then install the proxy server code on the proxy computer. The process software will be transmitted to the proxy server then stored on the proxy server.

While it is understood that the process software may be deployed by manually loading directly in the client, server and proxy computers via loading a storage medium such as a CD, DVD, etc., the process software may also be automatically or semi-automatically deployed into a computer system by sending the process software to a central server or a group of central servers. The process software is then downloaded into the client computers that will execute the process software. Alternatively the process software is sent directly to the client system via e-mail. The process software is then either detached to a directory or loaded into a directory by a button on the e-mail that executes a program that detaches the process software into a directory. Another alternative is to send the process software directly to a directory on the client computer hard drive. When there are proxy servers, the process will, select the proxy server code, determine on which computers to place the proxy servers' code, transmit the proxy server code, then install the proxy server code on the proxy computer. The process software will be transmitted to the proxy server then stored on the proxy server.

Figure 4:
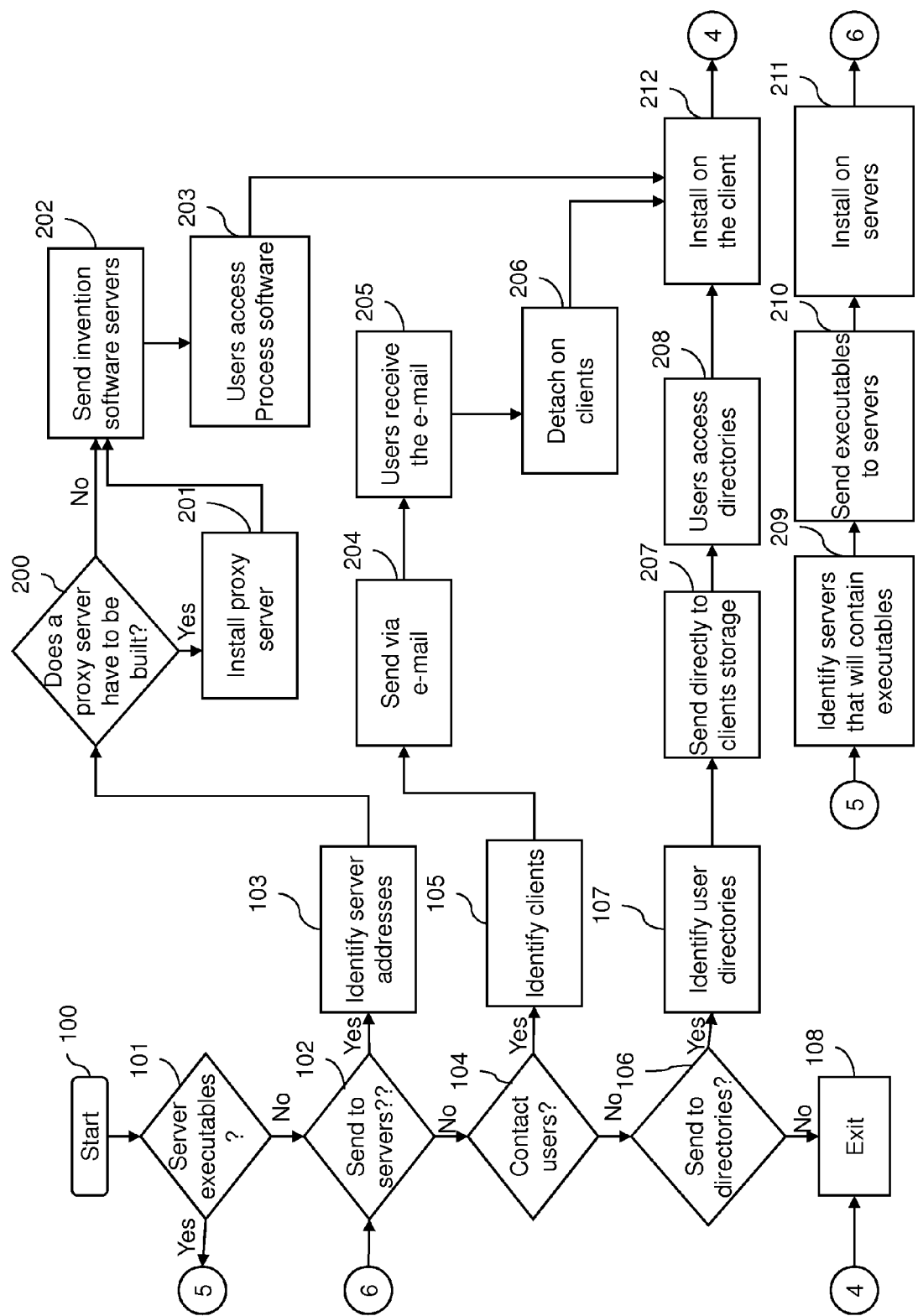
FIG. 4 is a schematic diagram of a deployment system according to embodiments herein.

As shown in FIG. 4, step 100 begins the deployment of the process software. The first thing is to determine if there are any programs that will reside on a server or servers when the process software is executed 101. If this is the case then the servers that will contain the executables are identified 209. The process software for the server or servers is transferred directly to the servers' storage via FTP or some other protocol or by copying though the use of a shared file system 210. The process software is then installed on the servers 211.

Next, a determination is made on whether the process software is be deployed by having users access the process software on a server or servers 102. If the users are to access the process software on servers then the server addresses that will store the process software are identified 103.

A determination is made if a proxy server is to be built 200 to store the process software. A proxy server is a server that sits between a client application, such as a Web browser, and a real server. It intercepts all requests to the real server to see if it can fulfill the requests itself. If not, it forwards the request to the real server. The two primary benefits of a proxy server are to improve performance and to filter requests. If a proxy server is required then the proxy server is installed 201. The process software is sent to the servers either via a protocol such as FTP or it is copied directly from the source files to the server files via file sharing 202. Another embodiment would be to send a transaction to the servers that contained the process software and have the server process the transaction, then receive and copy the process software to the server's file system. Once the process software is stored at the servers, the users via their client computers, then access the process software on the servers and copy to their client computers file systems 203. Another embodiment is to have the servers automatically copy the process software to each client and then run the installation program for the process software at each client computer. The user executes the program that installs the process software on his client computer 212 then exits the process 108.

In step 104 a determination is made whether the process software is to be deployed by sending the process software to users via e-mail. The set of users where the process software will be deployed are identified together with the addresses of the user client computers 105. The process software is sent via e-mail to each of the users' client computers. The users then receive the e-mail 205 and then detach the process software from the e-mail to a directory on their client computers 206. The user executes the program that installs the process software on his client computer 212 then exits the process 108.

Lastly, a determination is made on whether the process software will be sent directly to user directories on their client computers 106. If so, the user directories are identified 107. The process software is transferred directly to the user's client computer directory 207. This can be done in several ways such as but not limited to sharing of the file system directories and then copying from the sender's file system to the recipient user's file system or alternatively using a transfer protocol such as File Transfer Protocol (FTP). The users access the directories on their client file systems in preparation for installing the process software 208. The user executes the program that installs the process software on his client computer 212 then exits the process 108.

The process software which is integrated into a client, server and network environment by providing for the process software to coexist with applications, operating systems and network operating systems software and then installing the process software on the clients and servers in the environment where the process software will function.

The first step is to identify any software on the clients and servers including the network operating system where the process software will be deployed that are required by the process software or that work in conjunction with the process software. This includes the network operating system that is software that enhances a basic operating system by adding networking features.

Next, the software applications and version numbers will be identified and compared to the list of software applications and version numbers that have been tested to work with the process software. Those software applications that are missing or that do not match the correct version will be upgraded with the correct version numbers. Program instructions that pass parameters from the process software to the software applications will be checked to ensure the parameter lists matches the parameter lists required by the process software. Conversely parameters passed by the software applications to the process software will be checked to ensure the parameters match the parameters required by the process software. The client and server operating systems including the network operating systems will be identified and compared to the list of operating systems, version numbers and network software that have been tested to work with the process software. Those operating systems, version numbers and network software that do not match the list of tested operating systems and version numbers will be upgraded on the clients and servers to the required level.

After ensuring that the software, where the process software is to be deployed, is at the correct version level that has been tested to work with the process software, the integration is completed by installing the process software on the clients and servers.

Figure 5:
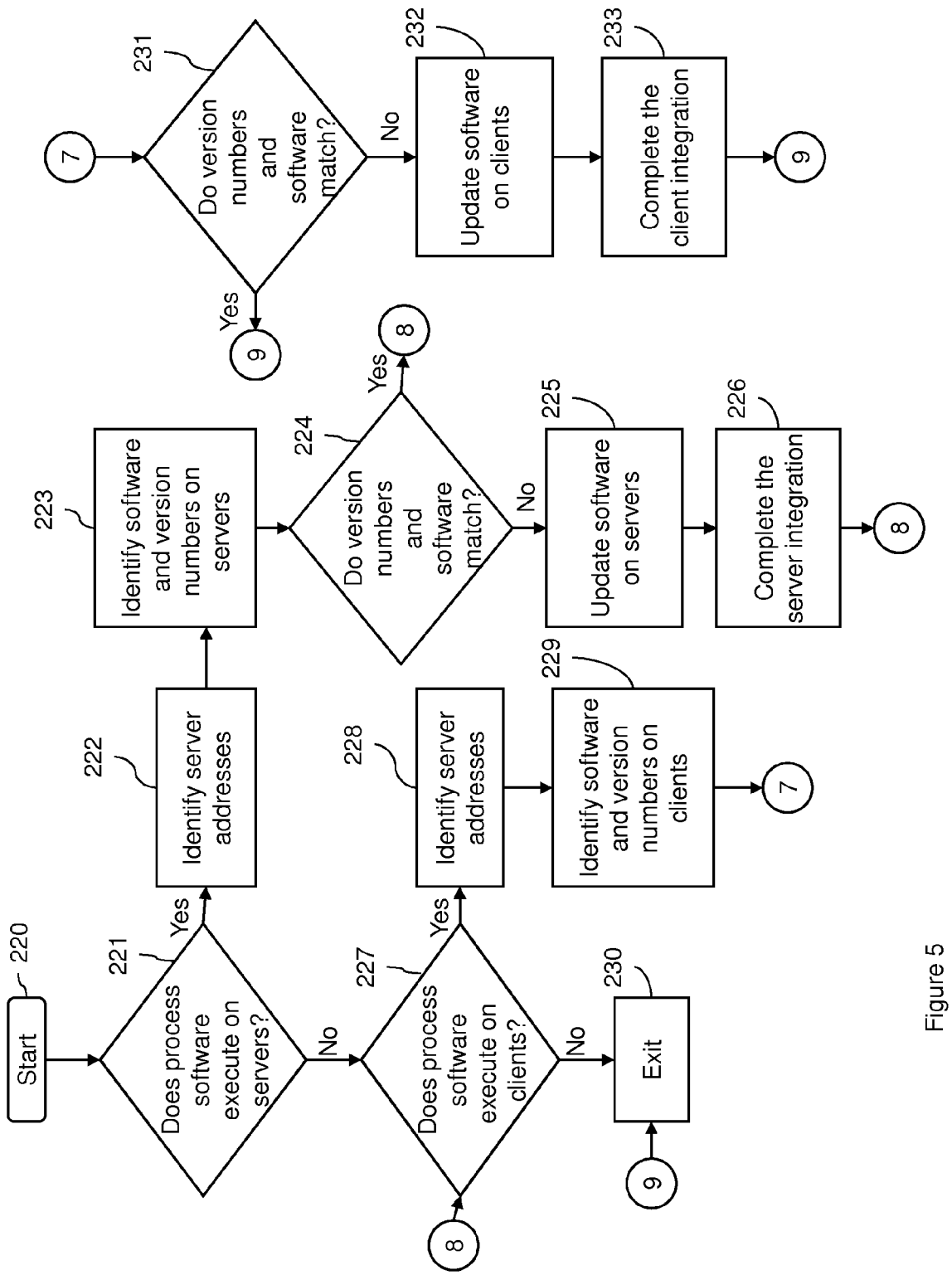
FIG. 5 is a schematic diagram of an integration system according to embodiments herein.

As shown in FIG. 5, step 220 begins the integration of the process software. The first thing is to determine if there are any process software programs that will execute on a server or servers 221. If this is not the case, then integration proceeds to 227. If this is the case, then the server addresses are identified 222. The servers are checked to see if they contain software that includes the operating system (OS), applications, and network operating systems (NOS), together with their version numbers, that have been tested with the process software 223. The servers are also checked to determine if there is any missing software that is required by the process software 223.

A determination is made if the version numbers match the version numbers of OS, applications and NOS that have been tested with the process software 224. If all of the versions match and there is no missing required software the integration continues in 227.

If at least one of the version numbers do not match, then the unmatched versions are updated on the server or servers with the correct versions 225. Additionally if there is missing required software, then it is updated on the server or servers 225. The server integration is completed by installing the process software 226.

Step 227 which follows either 221, 224 or 226 determines if there are any programs of the process software that will execute on the clients. If no process software programs execute on the clients the integration proceeds to 230 and exits. If this not the case, then the client addresses are identified 228.

The clients are checked to see if they contain software that includes the operating system (OS), applications, and network operating systems (NOS), together with their version numbers, that have been tested with the process software 229.

The clients are also checked to determine if there is any missing software that is required by the process software 229.

A determination is made as to whether the version numbers match the version numbers of OS, applications and NOS that have been tested with the process software 231. If all of the versions match and there is no missing required software, then the integration proceeds to 230 and exits.

If at least one of the version numbers do not match, then the unmatched versions are updated on the clients with the correct versions 232. In addition, if there is missing required software then it is updated on the clients 232. The client integration is completed by installing the process software on the clients 233. The integration proceeds to 230 and exits.

The process software can be stored on a shared file system accessible from at least one server. The process software is executed via transactions that contain data and server processing requests that use CPU units on the accessed server. CPU units are units of time such as minutes, seconds, hours on the central processor of the server. Additionally the assessed server may make requests of other servers that require CPU units. CPU units are an example that represents but one measurement of use. Other measurements of use include but are not limited to network bandwidth, memory usage, storage usage, packet transfers, complete transactions etc. When multiple customers use the same process software application, their transactions are differentiated by the parameters included in the transactions that identify the unique customer and the type of service for that customer. All of the CPU units and other measurements of use that are used for the services for each customer are recorded. When the number of transactions to any one server reaches a number that begins to effect the performance of that server, other servers are accessed to increase the capacity and to share the workload. Likewise when other measurements of use such as network bandwidth, memory usage, storage usage, etc. approach a capacity so as to effect performance, additional network bandwidth, memory usage, storage etc. are added to share the workload. The measurements of use used for each service and customer are sent to a collecting server that sums the measurements of use for each customer for each service that was processed anywhere in the network of servers that provide the shared execution of the process software. The summed measurements of use units are periodically multiplied by unit costs and the resulting total process software application service costs are alternatively sent to the customer and or indicated on a web site accessed by the customer which then remits payment to the service provider. In another embodiment, the service provider requests payment directly from a customer account at a banking or financial institution. In another embodiment, if the service provider is also a customer of the customer that uses the process software application, the payment owed to the service provider is reconciled to the payment owed by the service provider to minimize the transfer of payments.

The process software is shared, simultaneously serving multiple customers in a flexible, automated fashion. It is standardized, requiring little customization and it is scalable, providing capacity on demand in a payas-you-go model.

The process software can be stored on a shared file system accessible from at least one server. The process software is executed via transactions that contain data and server processing requests that use CPU units on the accessed server. CPU units are units of time such as minutes, seconds, hours on the central processor of the server. Additionally the assessed server may make requests of other servers that require CPU units. CPU units are an example that represents but one measurement of use. Other measurements of use include but are not limited to network bandwidth, memory usage, storage usage, packet transfers, complete transactions etc.

When multiple customers use the same process software application, their transactions are differentiated by the parameters included in the transactions that identify the unique customer and the type of service for that customer. All of the CPU units and other measurements of use that are used for the services for each customer are recorded. When the number of transactions to any one server reaches a number that begins to effect the performance of that server, other servers are accessed to increase the capacity and to share the workload. Likewise when other measurements of use such as network bandwidth, memory usage, storage usage, etc. approach a capacity so as to effect performance, additional network bandwidth, memory usage, storage etc. are added to share the workload.

The measurements of use used for each service and customer are sent to a collecting server that sums the measurements of use for each customer for each service that was processed anywhere in the network of servers that provide the shared execution of the process software. The summed measurements of use units are periodically multiplied by unit costs and the resulting total process software application service costs are alternatively sent to the customer and or indicated on a web site accessed by the customer which then remits payment to the service provider. In another embodiment, the service provider requests payment directly from a customer account at a banking or financial institution. In another embodiment, if the service provider is also a customer of the customer that uses the process software application, the payment owed to the service provider is reconciled to the payment owed by the service provider to minimize the transfer of payments.

Figure 6:
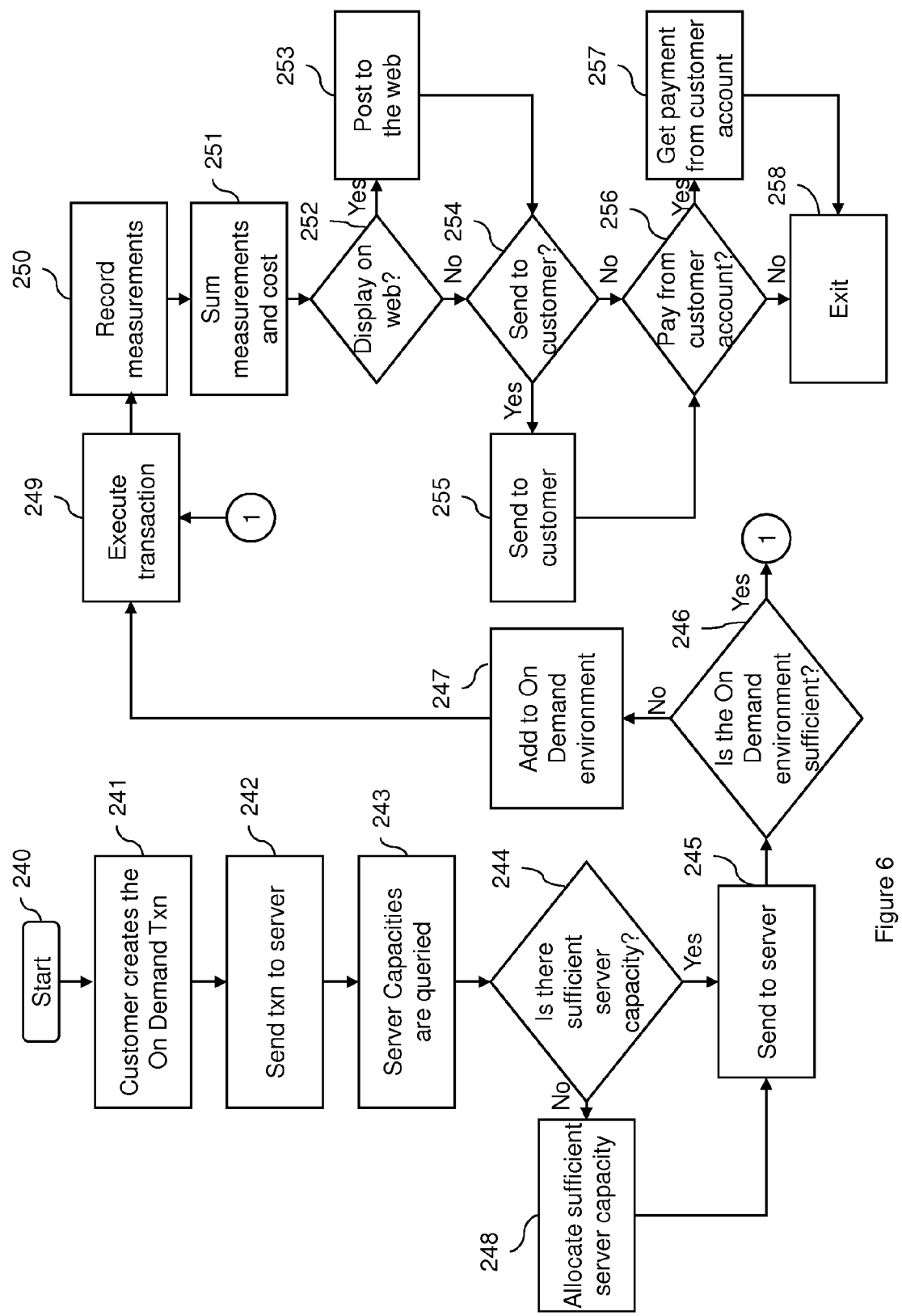
FIG. 6 is a schematic diagram of an on demand system according to embodiments herein.

As shown in FIG. 6, step 240 begins the On Demand process. A transaction is created that contains the unique customer identification, the requested service type and any service parameters that further specify the type of service 241. The transaction is then sent to the main server 242. In an On Demand environment, the main server can initially be the only server, then as capacity is consumed other servers are added to the On Demand environment.

The server central processing unit (CPU) capacities in the On Demand environment are queried 243. The CPU requirement of the transaction is estimated, then the servers available CPU capacity in the On Demand environment are compared to the transaction CPU requirement to see if there is sufficient CPU available capacity in any server to process the transaction 244. If there is not sufficient server CPU available capacity, then additional server CPU capacity is allocated to process the transaction 248. If there was already sufficient Available CPU capacity then the transaction is sent to a selected server 245.

Before executing the transaction, a check is made of the remaining On Demand environment to determine if the environment has sufficient available capacity for processing the transaction. This environment capacity consists of such things as but not limited to network bandwidth, processor memory, storage etc. 246. If there is not sufficient available capacity, then capacity will be added to the On Demand environment 247. Next, the required software to process the transaction is accessed, loaded into memory, then the transaction is executed 249.

The usage measurements are recorded 250. The usage measurements consist of the portions of those functions in the On Demand environment that are used to process the transaction. The usage of such functions is, but not limited to, network bandwidth, processor memory, storage and CPU cycles are what is recorded. The usage measurements are summed, multiplied by unit costs and then recorded as a charge to the requesting customer 251. If the customer has requested that the On Demand costs be posted to a web site 252 then they are posted 253.

If the customer has requested that the On Demand costs be sent via e-mail to a customer address 254 then they are sent 255. If the customer has requested that the On Demand costs be paid directly from a customer account 256 then payment is received directly from the customer account 257. The last step is to exit the On Demand process 258.

The process software may be deployed, accessed and executed through the use of a virtual private network (VPN), which is any combination of technologies that can be used to secure a connection through an otherwise unsecured or untrusted network. The use of VPNs is to improve security and for reduced operational costs. The VPN makes use of a public network, usually the Internet, to connect remote sites or users together. Instead of using a dedicated, real-world connection such as leased line, the VPN uses "virtual" connections routed through the Internet from the company's private network to the remote site or employee.

The process software may be deployed, accessed and executed through either a remote-access or a site-to-site VPN. When using the remote-access VPNs the process software is deployed, accessed and executed via the secure, encrypted connections between a company's private network and remote users through a third-party service provider. The enterprise service provider (ESP) sets a network access server (NAS) and provides the remote users with desktop client software for their computers. The telecommuters can then dial a toll-free number or attach directly via a cable or DSL modem to reach the NAS and use their VPN client software to access the corporate network and to access, download and execute the process software.

When using the site-to-site VPN, the process software is deployed, accessed and executed through the use of dedicated equipment and large-scale encryption that are used to connect a companies multiple fixed sites over a public network such as the Internet.

The process software is transported over the VPN via tunneling which is the process of placing an entire packet within another packet and sending it over a network. The protocol of the outer packet is understood by the network and both points, called tunnel interfaces, where the packet enters and exits the network.

Figure 7:
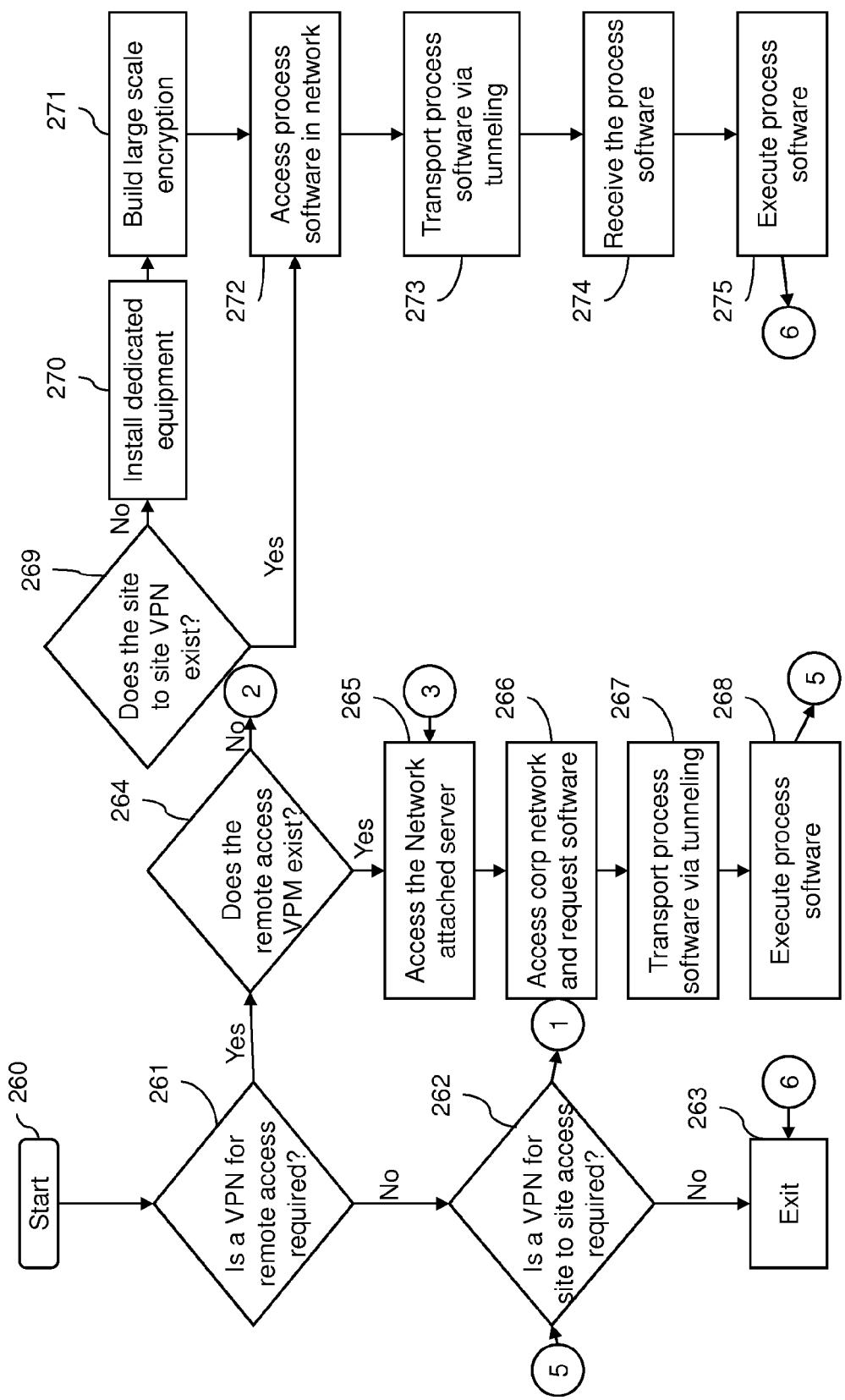
FIG. 7 is a schematic diagram of a virtual private network system according to embodiments herein.

As shown in FIG. 7, step 260 begins the Virtual Private Network (VPN) process. A determination is made to see if a VPN for remote access is required 261. If it is not required, then proceed to 262. If it is required, then determine if the remote access VPN exists 264.

If it does exist, then proceed to 265. Otherwise identify the third party provider that will provide the secure, encrypted connections between the company's private network and the company's remote users 276. The company's remote users are identified 277. The third party provider then sets up a network access server (NAS) 278 that allows the remote users to dial a toll free number or attach directly via a cable or DSL modem to access, download and install the desktop client software for the remote-access VPN 279.

After the remote access VPN has been built or if it been previously installed, the remote users can then access the process software by dialing into the NAS or attaching directly via a cable or DSL modem into the NAS 265. This allows entry into the corporate network where the process software is accessed 266. The process software is transported to the remote user's desktop over the network via tunneling. That is the process software is divided into packets and each packet including the data and protocol is placed within another packet 267. When the process software arrives at the remote user's desktop, it is removed from the packets, reconstituted and then is executed on the remote users desktop 268.

A determination is made to see if a VPN for site to site access is required 262. If it is not required, then proceed to exit the process 263. Otherwise, determine if the site to site VPN exists 269. If it does exist, then proceed to 272. Otherwise, install the dedicated equipment required to establish a site to site VPN 270. Then build the large scale encryption into the VPN 271.

After the site to site VPN has been built or if it had been previously established, the users access the process software via the VPN 272. The process software is transported to the site users over the network via tunneling. That is the process software is divided into packets and each packet including the data and protocol is placed within another packet 274. When the process software arrives at the remote user's desktop, it is removed from the packets, reconstituted and is executed on the site users desktop 275. Proceed to exit the process 263.

Figure 8:
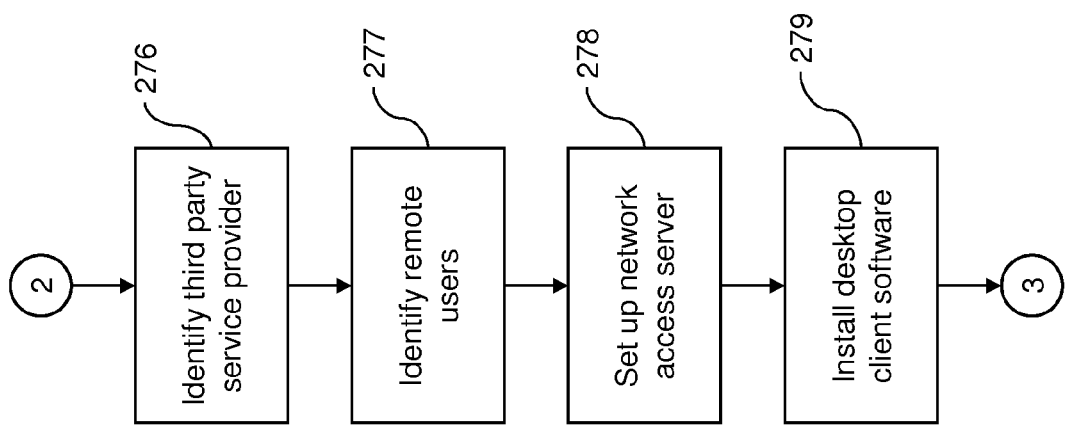
FIG. 8 is a schematic diagram of a virtual private network system according to embodiments herein.

As shown in FIG. 8, if it does exist, then proceed to 265. Otherwise, identify the third party provider that will provide the secure, encrypted connections between the company's private network and the company's remote users 276. The company's remote users are identified 277. The third party provider then sets up a network access server (NAS) 278 that allows the remote users to dial a toll free number or attach directly via a cable or DSL modem to access, download and install the desktop client software for the remote-access VPN 279.

After the remote access VPN has been built or if it has been previously installed, the remote users can then access the process software by dialing into the NAS or attaching directly via a cable or DSL modem into the NAS 265. This allows entry into the corporate network where the process software is accessed 266. The process software is transported to the remote user's desktop over the network via tunneling. That is the process software is divided into packets and each packet including the data and protocol is placed within another packet 267. When the process software arrives at the remote user's desktop, it is removed from the packets, reconstituted and then is executed on the remote users desktop 268.

A determination is made to see if a VPN for site to site access is required 262. If it is not required, then proceed to exit the process 263. Otherwise, determine if the site to site VPN exists 269. If it does exist, then proceed to 272. Otherwise, install the dedicated equipment required to establish a site to site VPN 270. Then build the large scale encryption into the VPN 271.

After the site to site VPN has been built or if it had been previously established, the users access the process software via the VPN 272. The process software is transported to the site users over the network via tunneling. That is the process software is divided into packets and each packet including the data and protocol is placed within another packet 274. When the process software arrives at the remote user's desktop, it is removed from the packets, reconstituted and is executed on the site users desktop 275. Proceed to exit the process 263.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A computer-implemented method comprising:
receiving a request into computing devices from a first user having at least one first user instance running within a cloud-computing environment;
automatically analyzing said first user instance to produce first user instance characteristics, using said computing devices;
automatically analyzing second characteristics of other user instances currently running within said cloud-computing environment, using said computing devices, said first user instance and said other user instances each comprising one of multiple instances of a same program of instructions executing within said cloud-computing environment by utilizing resources of said cloud-computing environment, said other user instances being operated by other users different from said first user;
automatically matching said first user instance to matching instances of said other user instances by determining which of said other user instances have ones of said second characteristics that match said first user instance characteristics, using said computing devices;
automatically identifying cloud-computing options selected by said other users within said matching instances that are related to said request, using said computing devices; and
automatically making recommendations to said first user using said computing devices, said recommendations including said cloud-computing options selected within said matching instances.

2. The method according to claim 1, said receiving of said request comprising receiving, from said first user, at least one of:
input to a selection wizard operating on said computing devices; and
requests to periodically provide feeds through said computing devices.

3. The method according to claim 1, further comprising identifying said other instances by identifying and analyzing instance status comprising at least one of:
instances running within said cloud-computing environment;
instances stopped on said cloud-computing environment;
instances stopping on said cloud-computing environment;
instances failed on said cloud-computing environment;
instances provisioning on said cloud-computing environment; and
instances restarting on said cloud-computing environment.

4. The method according to claim 1, said first user instance characteristics and said second characteristics comprising a classification of software programs utilized, resources utilized, usage rates, usage requirements, and instance history.

5. The method according to claim 1, said request comprising at least one of:
a request for an image resource and said recommendations comprising options relating to said image resource; and
a software upgrade and said recommendations comprising options relating to said software upgrade.

6. The method according to claim 1, said cloud-computing options comprising configuration and selection choices.

7. A computer-implemented method comprising:
receiving goals desired to be accomplished into computing devices from a first user having at least one first user instance running within a cloud-computing environment;
automatically analyzing said first user instance to produce first user instance characteristics, using said computing devices;
automatically analyzing second characteristics of other user instances currently running within said cloud-computing environment, using said computing devices, said first user instance and said other user instances each comprising one of multiple instances of a same program of instructions executing within said cloud-computing environment by utilizing resources of said cloud-computing environment, said other user instances being operated by other users different from said first user;
automatically matching said first user instance to matching instances of said other user instances by determining which of said other user instances have ones of said second characteristics that match said first user instance characteristics, using said computing devices;
automatically identifying cloud-computing options selected by said other users within said matching instances that are related to said goals, using said computing devices;
automatically making recommendations to said first user using said computing devices, said recommendations including said cloud-computing options selected within said matching instances;
receiving feedback in response to said recommendations from said first user, using said computing devices; and
automatically refining said recommendations based on said feedback, using said computing devices.

8. The method according to claim 7, said receiving of said goals comprising receiving, from said first user, at least one of:
input to a selection wizard operating on said computing devices; and
requests to periodically provide feeds through said computing devices.

9. The method according to claim 7, further comprising identifying said other instances by identifying and analyzing:
instances running within said cloud-computing environment;
instances stopped on said cloud-computing environment;
instances stopping on said cloud-computing environment;
instances failed on said cloud-computing environment;
instances provisioning on said cloud-computing environment; and
instances restarting on said cloud-computing environment.

10. The method according to claim 7, said first user instance characteristics and said second characteristics comprising a classification of software programs utilized, resources utilized, usage rates, usage requirements, and instance history.

11. The method according to claim 7, said goals comprising at least one of:
  goals related to an image resource and said recommendations comprising options relating to said image resource; and
  goals related to a software upgrade and said recommendations comprising options relating to said software upgrade.

12. The method according to claim 7, said cloud-computing options comprising configuration and selection choices.

13. A computerized system comprising:
  computing devices,
  said computing devices each comprising a processor,
  said computing devices each comprising an input/output connection operatively connected to each said processor of said computing devices, said input/output being further connected to a cloud-computing environment, said cloud-computing environment comprising a plurality of computing machines connected to a computerized network providing computing resources to said computing devices through said computerized network,
  said computing devices each comprising a user interface operatively connected to each said processor of said computing devices receiving a request from a first user having at least one first user instance running within said cloud-computing environment,
  each said processor of said computing devices automatically analyzing said first user instance to produce first user instance characteristics,
  each said processor of said computing devices automatically analyzing second characteristics of other user instances currently running within said cloud-computing environment, said first user instance and said other user instances each comprising one of multiple instances of a same program of instructions executing within said cloud-computing environment by utilizing resources of said cloud-computing environment, said other user instances being operated by other users different from said first user,
  each said processor of said computing devices automatically matching said first user instance to matching instances of said other user instances by determining which of said other user instances have ones of said second characteristics that match said first user instance characteristics,
  each said processor of said computing devices automatically identifying cloud-computing options selected by said other users within said matching instances that are related to said request,
  each said user interface of said computing devices automatically making recommendations to said first user, said recommendations including said cloud-computing options selected within said matching instances.

14. The system according to claim 13, said receiving of said request comprising receiving, from said first user, at least one of:
  input to a selection wizard operating on said computing devices; and
  requests to periodically provide feeds through said computing devices.

15. The system according to claim 13, each said processor identifying said other instances by identifying and analyzing:
  instances running within said cloud-computing environment;
  instances stopped on said cloud-computing environment;
  instances stopping on said cloud-computing environment;
  instances failed on said cloud-computing environment;
  instances provisioning on said cloud-computing environment; and
  instances restarting on said cloud-computing environment.

16. The system according to claim 13, said first user instance characteristics and said second characteristics comprising a classification of software programs utilized, resources utilized, usage rates, usage requirements, and instance history.

17. The system according to claim 13, said request comprising at least one of:
  a request for an image resource and said recommendations comprising options relating to said image resource; and
  a software upgrade and said recommendations comprising options relating to said software upgrade.

18. The system according to claim 13, said cloud-computing options comprising configuration and selection choices.

19. A tangible computer storage medium device tangibly storing a program of instructions executable by a computing device, said program of instructions causing said computing device to perform a method comprising:
  receiving a request from a first user having at least one first user instance running within a cloud-computing environment;
  automatically analyzing said first user instance to produce first user instance characteristics;
  automatically analyzing second characteristics of other user instances currently running within said cloud-computing environment, said first user instance and said other user instances each comprising one of multiple instances of a same program of instructions executing within said cloud-computing environment by utilizing resources of said cloud-computing environment, said other user instances being operated by other users different from said first user;
  automatically matching said first user instance to matching instances of said other user instances by determining which of said other user instances have ones of said second characteristics that match said first user instance characteristics;
  automatically identifying cloud-computing options selected by said other users within said matching instances that are related to said request; and
  automatically making recommendations to said first user, said recommendations including said cloud-computing options selected within said matching instances.

20. The tangible computer storage medium device according to claim 19, said receiving of said request comprising receiving, from said first user, at least one of:
  input to a selection wizard operating on said computing devices; and
  requests to periodically provide feeds through said computing devices.

21. The tangible computer storage medium device according to claim 19, said method further comprising identifying said other instances by identifying and analyzing:
  instances running within said cloud-computing environment;
  instances stopped on said cloud-computing environment;
  instances stopping on said cloud-computing environment;
  instances failed on said cloud-computing environment;
  instances provisioning on said cloud-computing environment; and
  instances restarting on said cloud-computing environment.

22. The tangible computer storage medium device according to claim 19, said first user instance characteristics and said second characteristics comprising a classification of software programs utilized, resources utilized, usage rates, usage requirements, and instance history.

23. The tangible computer storage medium device according to claim 19, said request comprising at least one of:
- a request for an image resource and said recommendations comprising options relating to said image resource; and
- a software upgrade and said recommendations comprising options relating to said software upgrade.

24. The tangible computer storage medium device according to claim 19, said cloud-computing options comprising configuration and selection choices.

* * * * *